I. W. BRITTAN.
Fifth Wheel
No. 1,381.    Patented Oct. 26. 1839.
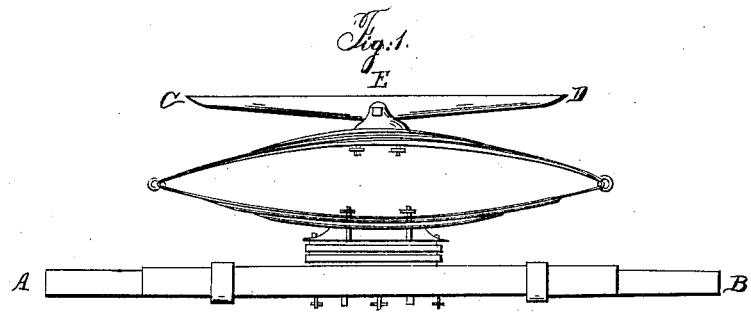
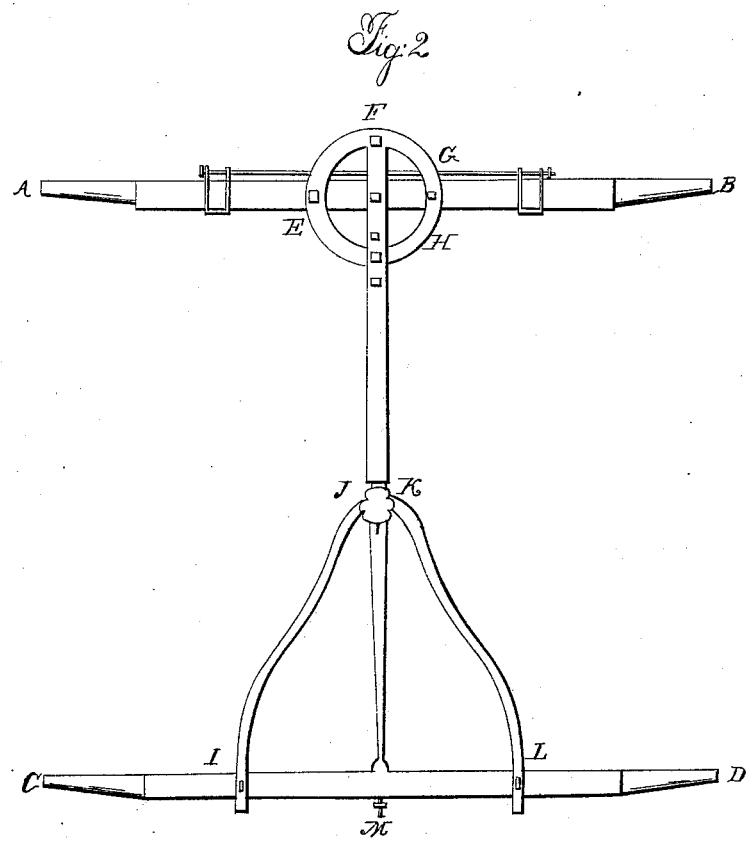
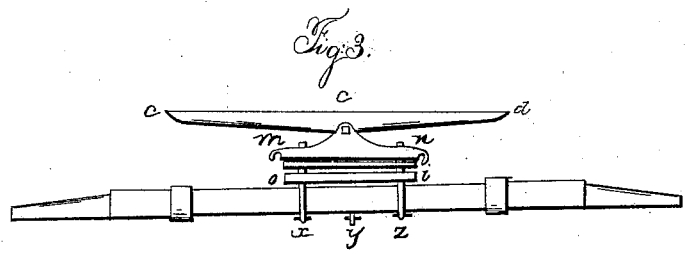

UNITED STATES PATENT OFFICE.

IRA W. BRITTON, OF MEDINA, OHIO.

MODE OF HANGING CARRIAGE-BODIES.

Specification of Letters Patent No. 1,381, dated October 26, 1839.

*To all whom it may concern:*

Be it known that I, IRA W. BRITTON, of Medina, in the county of Medina and State of Ohio, have invented a new and useful improvement in the mode of hanging or gearing four-wheeled carriages of every description, not heretofore known or used, in the spring-bar or rocker-joint of such carriages, and which is recommended to be used in all cases in connection with the rolling wagon-reach described in Newton's *London Journal of Arts and Sciences*, (vol. 13, page 139, and vol. 14, page 121, of the first series.)

Said invention is confined to said "rocker joint" only, of which the following is a full, true, and accurate description, to wit: This new "rocker joint" is represented as elevated on elliptical springs, at (E) in Figure 1 in the drawings to this specification annexed, and as elevated on a head block resting on the center of the forward axletree, as at (e) in Fig. 3 of said drawings. This rocker joint is made of iron or other materials of sufficient strength and consists simply of two large parallel ears, raised perpendicularly from the sides of a stout convex plate of iron covering the upper convex surface of said head block, said ears having large parallel horizontal bolt holes of equal size pierced near their tops, as seen at (E) (e) in said figure. The iron plate from which these ears are raised, is seen covering the upper surface of said head block, as at (m, n) in said Fig. 3, and between these ears and on its even center rests the spring bar or rocker, as at C, D in said Fig. 1 and at (c, d) in said Fig. 3, on a strong bolt passing through a hole in or just below its center and through said holes in the tops of said ears, as at (E) and (e), as aforesaid, an iron thimble being inserted in the hole in said rocker to prevent the chafing and wearing of said bolt. Said head block, as seen at (m, n) in said Fig. 3 is to be made of sound wood with flat sides and bottom, with convex tops, as aforesaid, and width corresponding to that of the plate which covers it, and is to rest on the top of a large flat iron ring of a diameter corresponding with the length of said block, to which it is bolted, as seen at (o, i) in said Fig. 3, and said ring more distinctly at E, F, G, H in Fig. 11 in said drawings. This first ring is to rest on the upper surface of another iron ring of corresponding size, shape and dimensions, or if necessary, of still greater thickness and strength which said last mentioned ring is to be bolted directly on and over the center of the forward axletree, as seen in said Fig. 1, but more distinctly in said Fig. 3, at o, i, the lower ends of the bolts being seen at x, y, and z, in said Fig. 3, the king bolt between y, and e, in said Fig. 3, passing down through the center of said head block, as well as through the centers of said rings. Said rings being firmly secured to each other by said king bolt, turn in and around each other, permitting said forward axletree freely to turn either way. Said ears may be made of any size or convenient shape, and may be elevated to any height necessary. Said rings and head block may also be varied in size and strength, and the upper part of said head block be more or less convex at pleasure, it being recommended in all cases to raise the whole to a sufficient height to enable said spring bar or rocker, always to ride parallel with the hinder axletree on the most uneven ground. It is strongly recommended in all cases to use said rocker joints in connection with the rolling wagon reach before mentioned, which is also represented in said Fig. 11 in said drawings. In this figure it is represented as a solid bar of iron or other materials, extending from (F) to (M), being square or octagonal from (F) to (J, K), where (at J, K) it passes through a circular hole or socket between the hounds or hind braces, whence to its hinder end as at (M), it is round and tapering, passing through another circular hole in the center of the hinder axletree at said (M), where it is confined by a nut screwed on to said hinder end, and said reach turns or rolls in said sockets or holes, between said hounds and through said hinder axletree. The two hounds or hind braces (I, J) and (K, L) in said Fig. 11, are recommended to be made of iron of shape and size sufficient for the degree of strength required in them, with said circular socket, as at (J, K) between them, made just large enough to receive said reach, which said reach has a key hole and key in it just behind said socket. In this last figure also is a vertical view of the uppermost of said rings, as at E, F, G, H, lying on and over its corresponding under one, of the same diameter, and resting on the forward axletree A, B.

What I claim as my invention in the foregoing specification, and desire to secure by Letters Patent, is—

The said "rocker joint" as aforesaid described, and nothing more, the same being recommended always to be used in connection with the said "rolling wagon reach," as aforesaid described.

The use of this invention is, to prevent all straining or twisting of the springs and boxes or bodies of four wheeled carriages, when passing over uneven ground.

IRA W. BRITTON.

Witnesses:
JULIUS G. MORSE,
IRWIN MORSE.